(12) United States Patent
Balasubramanian et al.

(10) Patent No.: US 8,997,045 B2
(45) Date of Patent: Mar. 31, 2015

(54) PROCESSING PROPOSED PROGRAM CODE LIBRARIES IN A NETWORKED COMPUTING ENVIRONMENT

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/733,286

(22) Filed: Jan. 3, 2013

(65) Prior Publication Data

US 2014/0189668 A1     Jul. 3, 2014

(51) Int. Cl.
*G06F 9/44* (2006.01)
(52) U.S. Cl.
CPC .................................. *G06F 8/36* (2013.01)
USPC ........... 717/121; 717/100; 717/107; 717/162; 717/168; 717/171

(58) Field of Classification Search
None
See application file for complete search history.

(56) References Cited

U.S. PATENT DOCUMENTS

| | | | |
|---|---|---|---|
| 5,923,882 A | 7/1999 | Ho et al. | |
| 6,202,205 B1 | 3/2001 | Saboff et al. | |
| 6,460,178 B1 | 10/2002 | Chan et al. | |
| 6,493,868 B1 * | 12/2002 | DaSilva et al. | 717/105 |
| 7,243,346 B1 | 7/2007 | Seth et al. | |
| 7,657,881 B2 | 2/2010 | Nagendra et al. | |
| 7,886,285 B2 | 2/2011 | Asselin et al. | |
| 2003/0191870 A1 | 10/2003 | Duggan | |
| 2007/0245322 A1 * | 10/2007 | Anand et al. | 717/140 |
| 2010/0281459 A1 * | 11/2010 | Betouin et al. | 717/106 |
| 2011/0265077 A1 | 10/2011 | Collison et al. | |

OTHER PUBLICATIONS

Ye et al., Supporting Reuse by Delivering Task-Relevant and Personalized Information, in ICSE'02, May 19-25, 2002, Orlando, FL.*
Garcia et al., Toward a Code Search Engine Based on the State-of-Art Practice, in XIII Asia Pacific Software Engineering Conference (APSEC'06), IEEE 2006.*

(Continued)

*Primary Examiner* — Wei Zhen
*Assistant Examiner* — Timothy Duncan
(74) *Attorney, Agent, or Firm* — William E. Schiesser; Keohane & D'Alessandro PLLC; Hunter E. Webb

(57) ABSTRACT

An integrated development environment (IDE)-based approach for processing/analyzing proposed program code libraries as a replacement for existing program code libraries in a networked computing environment is provided. A set of annotations associated with a set of program code files and a proposed (e.g., new, modified, etc.) program code library are received in an integrated development environment (IDE). It may then be determined whether the proposed program code library is an excluded program code library based on the set of annotations. It may also be determined whether the proposed program code library meets one or more thresholds for replacing an existing program code library. If the proposed program code library is not excluded and meets the threshold(s), the proposed program code library may then be provided to a computer device hosting the IDE (e.g., for implementation).

22 Claims, 6 Drawing Sheets

(56) References Cited

OTHER PUBLICATIONS

Guyer et al., An Annotation Language for Optimizing Software Libraries, ACM SIGPLAN Notices, vol. 35, Issue 1, Jan. 2000, pp. 39-52.*

Maitland, J., "Keeping Control Isn't Easy", Chapter 4: Cloud-Based Infrastructure, Search-CloudComputing.com, 13 pages.

Mell, P. et al., "The NIST Definition of Cloud Computing", National Institute of Standards and Technology, Information Technology Laboratory, Vers. 15, Oct. 7, 2009, 2 pages.

* cited by examiner

PROCESSING PROPOSED PROGRAM CODE LIBRARIES IN A NETWORKED COMPUTING ENVIRONMENT

TECHNICAL FIELD

Embodiments of the present invention relate to program code library processing. Specifically, embodiments of the present invention relate to an approach for processing and providing/authorizing proposed (e.g., new) program code libraries via an integrated development environment (IDE).

BACKGROUND OF THE INVENTION

A code repository is typically a searchable, categorized, and/or Internet-accessible location that users may access to browse, search, and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time. A code library is a collection of resources used to develop software. Such resources may include pre-written code and subroutines, classes, values, or type specifications. Code libraries may contain program code and/or data that provide services to independent programs. Such an implementation allows for program code and/or data to be shared and changed in a modular fashion. Micro benchmarks may not accurately predict real work performance, as the inputs to various library calls may be user driven and different than anticipated during development. Challenges may exist, however, in that existing approaches may not automatically process new and/or proposed program code libraries as replacements for existing program code libraries. That is, existing approaches typically rely on manual and/or disparate processing/analysis operations. Such approaches may be inefficient and/or less accurate.

SUMMARY

Embodiments of the present invention provide an integrated development environment (IDE)-based approach for processing/analyzing proposed program code libraries as a replacement for existing program code libraries in a networked computing environment (e.g., a cloud computing environment). In a typical embodiment, a set of annotations associated with a set of program code files and a proposed (e.g., new, modified, etc.) program code library are received in an integrated development environment (IDE). It may then be determined whether the proposed program code library is an excluded program code library based on the set of annotations. Moreover, it may be determined whether the proposed program code library meets one or more thresholds for replacing an existing program code library (e.g., based on an attribute comparison and/or a micro-benchmarking analysis). If the proposed program code library is not excluded and meets the threshold(s), the proposed program code library may then be provided to a computer device hosting the IDE (e.g., for implementation).

A first aspect of the present invention provides a computer-implemented method for processing proposed program code libraries in a networked computing environment, comprising: receiving a set of annotations associated with a set of program code files in an integrated development environment (IDE); receiving a proposed program code library in the IDE; determining whether the proposed program code library is an excluded program code library based on the set of annotations; computing whether the proposed program code library meets one or more thresholds for replacing an existing program code library, the computing being based on at least one of: an attribute comparison and a micro-benchmarking analysis; and providing, responsive to the proposed program code library meeting the one or more thresholds, the proposed program code library to a computer device hosting the IDE.

A second aspect of the present invention provides a system for processing proposed program code libraries in a networked computing environment, comprising: a memory medium comprising instructions; a bus coupled to the memory medium; and a processor coupled to the bus that when executing the instructions causes the system to: receive a set of annotations associated with a set of program code files in an integrated development environment (IDE); receive a proposed program code library in the IDE; determine whether the proposed program code library is an excluded program code library based on the set of annotations; compute whether the proposed program code library meets one or more thresholds for replacing an existing program code library, the computing being based on at least one of: an attribute comparison and a micro-benchmarking analysis; and provide, responsive the proposed program code library meeting the one or more thresholds, the proposed program code library to a computer device hosting the IDE.

A third aspect of the present invention provides a computer program product for processing proposed program code libraries in a networked computing environment comprising a computer readable storage media, and program instructions stored on the computer readable storage media, to: receive a set of annotations associated with a set of program code files in an integrated development environment (IDE); receive a proposed program code library in the IDE; determine whether the proposed program code library is an excluded program code library based on the set of annotations; compute whether the proposed program code library meets one or more thresholds for replacing an existing program code library, the computing being based on at least one of: an attribute comparison and a micro-benchmarking analysis; and provide, responsive the proposed program code library meeting the one or more thresholds, the proposed program code library to a computer device hosting the IDE.

A fourth aspect of the present invention provides a method for deploying a system for processing proposed program code libraries in a networked computing environment, comprising: providing a computer infrastructure being operable to: receive a set of annotations associated with a set of program code files in an integrated development environment (IDE); receive a proposed program code library in the IDE; determine whether the proposed program code library is an excluded program code library based on the set of annotations; compute whether the proposed program code library meets one or more thresholds for replacing an existing program code library, the computing being based on at least one of: an attribute comparison and a micro-benchmarking analysis; and provide, responsive to the proposed program code library meeting the one or more thresholds, the proposed program code library to a computer device hosting the IDE.

BRIEF DESCRIPTION OF THE DRAWINGS

These and other features of this invention will be more readily understood from the following detailed description of the various aspects of the invention taken in conjunction with the accompanying drawings in which.

Figure 1:
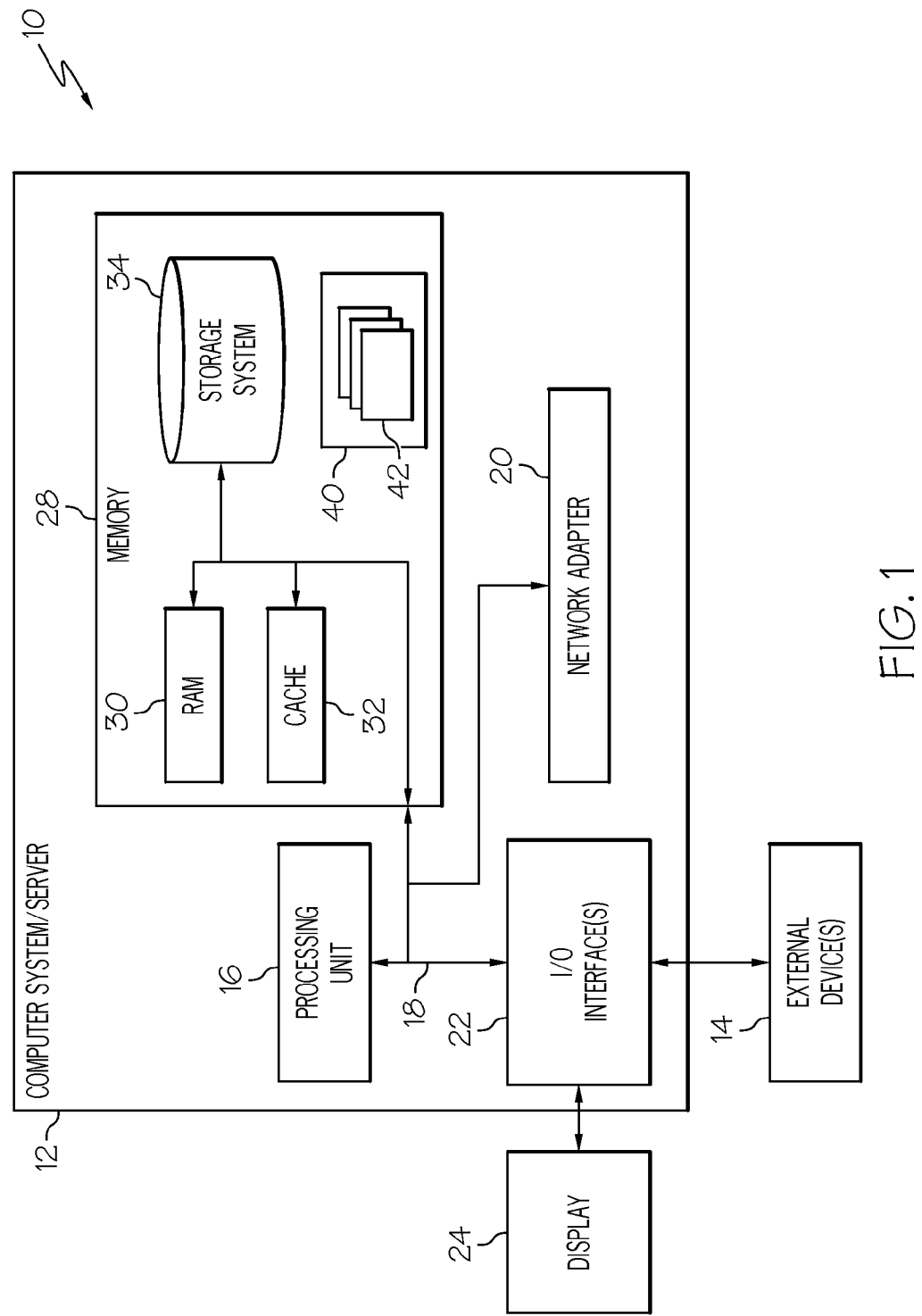
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an integrated development environment (IDE)-based approach for processing/analyzing proposed program code libraries as a replacement for existing program code libraries in a networked computing environment (e.g., a cloud computing environment). It a typical embodiment, a set of annotations associated with a set of program code files and a proposed (e.g., new, modified, etc.) program code library are received in an integrated development environment (IDE). It may then be determined whether the proposed program code library is an excluded program code library based on the set of annotations. Moreover, it may be determined whether the proposed program code library meets one or more thresholds for replacing an existing program code library (e.g., based on an attribute comparison and/or a micro-benchmarking analysis). If the proposed program code library is not excluded and meets the threshold(s), the proposed program code library may then be provided to a computer device hosting the IDE (e.g., for implementation).

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS—enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program code library processing program/utility 40, having a set (at least one) of program modules 42, may be stored in memory 28 by way of example, and not limitation, as well as an operating system, one or more application programs, other program modules, and program data. In general, program code library processing 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
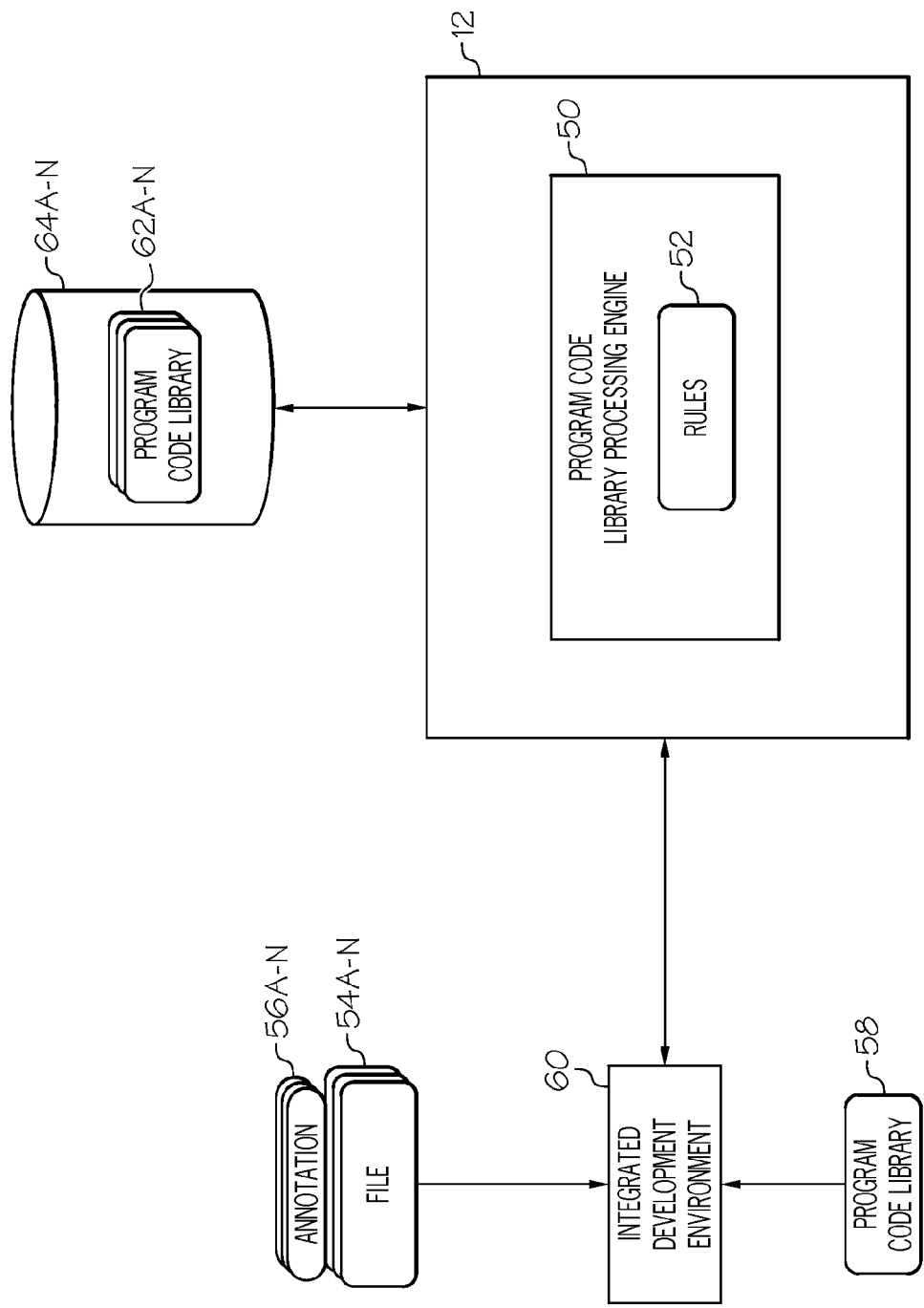
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a program code library processing (engine 50). Rather, engine 50 could be loaded on a server (e.g., payment processing server) or server-capable device that communicates (e.g., wirelessly) with the clients to provide program code library processing functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides program code library processing functionality hereunder.

Along these lines, engine 50 may perform multiple functions similar to a general-purpose computer. Specifically, among other functions, engine 50 may (among other things): detect a tag indicating a need for the proposed program code library 58; receive a set of annotations 56A-N (e.g., a class attribute description, an expected return value for processing an input, the one or more thresholds for replacing the existing program code library, or a set of excluded program code libraries with a set of exclusion reasons) associated with a set of program code files 54A-N in an integrated development environment (IDE) 60; receive a proposed program code library 58 in the IDE 60; determine whether the proposed program code library 58 is an excluded program code library based on the set of annotations (e.g., based on the set of excluded program code libraries or the set of exclusion rules); compute whether the proposed program code library 58 meets one or more thresholds for replacing one or more existing program code libraries 62A-N (e.g., stored in one or more computer storage devices 64A-N), the computing being based on at least one of: an attribute comparison and a microbenchmarking analysis (e.g., a comparison of a set of microbenchmarking times and a set of innovation stamps associated with the proposed program code library 58 and the existing program code library 62A-N); provide and/or "authorize for use", responsive the proposed program code library 58 meeting the one or more thresholds, the proposed program code library 58 to a computer device 66 hosting the IDE 60; send a notification if the proposed program code library 58 is excluded or does not meet the one or more thresholds; implement the proposed program code library 58.

It is understood that the example shown in FIG. 2 is intended to be illustrative only. For example, engine 50 could be loaded in a runtime environment (not shown), in IDE 60, or operate on a separate system 12 as shown that works in conjunction with the runtime environment and/or IDE 60. Regardless, it is understood that the specific architectural implementation shown in FIG. 2 is not intended to be limiting and that similar underlying functionality may be achieved with alternate architectures. For example, regardless of the specific architecture, a proposed program code library having corresponding annotation(s) may be received and analyzed. Based on the annotation(s) and a set of replacement thresholds, it may be determined whether the proposed program code library 58 may be used to replace one or more previous/existing program code libraries 62A-N.

Figure 3:
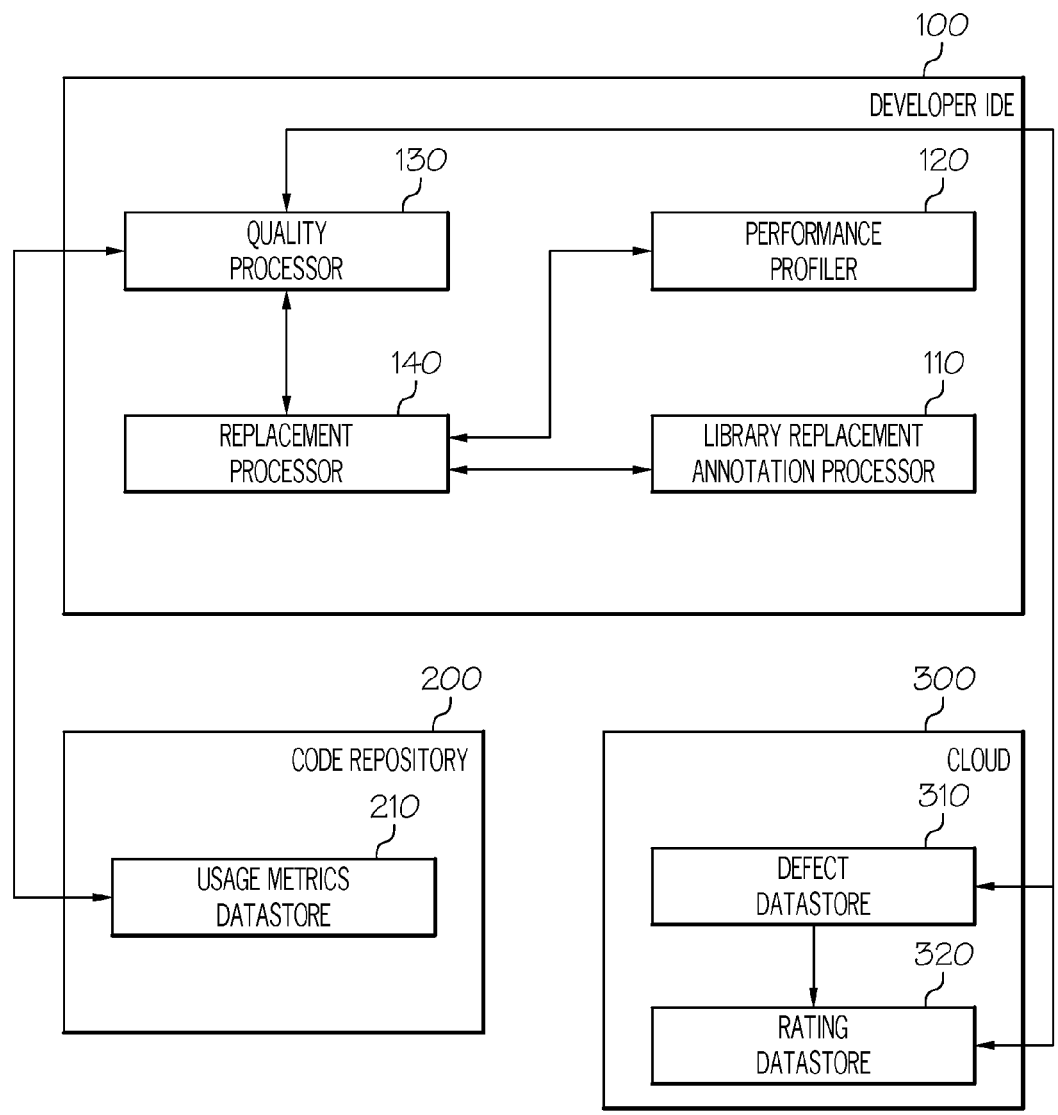
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via a developer IDE 100, a code repository 200 and cloud 300. The developer IDE 100 generally comprises a library replacement annotation processor 110, a performance profiler 120, a quality processor 130, and a replacement processor 140. Annotation processor 110 processes annotations related to program code library replacements. In one embodiment, the processor may store processed annotations within an index or the like. Replacement processor 140 detects new or changed program code libraries for methods in the annotation processor index. Processor 140 may utilize quality processor 130 and performance profiler 120 to determine if a selected program code library meets the quality/performance conditions for a replacement. Quality processor 130 utilizes usage metrics datastore 210 within code repository 200 and defect datastore 310 and rating datastore 320 within cloud 300 to obtain quality metrics.

Illustrative Embodiment

This section will describe various functions (e.g., via method, functions and/or modules) performed by engine 50 according to an illustrative example hereunder.

Annotation Processing

Annotation Parsing: Under this method, a user may (for example) seek a library to perform a base 64 encoding of strings. For their application, the user may wish the return from the library call to also be a string. To initiate a search, the user may then enter the following into the code where the user wishes to make the library invocation:

```
@Description (base64,encode)
@Expect("hello").Returns("aGVsbG8=")
@Signature("public String <method> String")
```

The above set of instructions request the IDE to invoke a search of repositories for methods containing the terms base64 and decode. For matching methods, the IDE should then narrow down methods that are public, return a String object and expect a single String object as a parameter. Furthermore, if that method is passed a string of "hello", the return value from that method should be a string of "aGVsbG8=". The user may be presented with a list of matching methods and the libraries from which those methods belong.

Should the user not be able to locate a suitable matching program code library, the user may document that using annotations, describing why each specific program code library was not selected. For example, the user may modify the annotation description to include the following:

```
@Description (base64,decode)
@Expect("hello").Returns("aGVsbG8=")
@FutureLibraryReplace ((responsetime>20% || heapsize>10%) &&
(rating>4
|| defectrate<25) && adoption>10 && @consolidate) //Look to replace
this with a program code library in the future
    @LibraryExclude(name="Acme Commons", reason="!@fluid")
    @LibraryExclude(name="ABC Codec", reason="@size>2M")
    @LibraryExclude(name="XYZ Codec", reason="@license");
```

Directly below the annotations, method signatures may be commenced and code needed for the method may be implemented.

public static String base64encoder(String unEncoded){ .... }

Additional annotations supported by these embodiments may include (among others): "Consolidate," "FutureLibraryReplace," and "LibraryExclude."

FutureLibraryReplace: This may be implemented as a tagging annotation that instructs the IDE that the user only crafted his/her own code because no suitable program code library existed. This indicates to the IDE that this function may be replaced by a known program code library from a repository if a matching program code library exists. Further, the user may supply certain conditions that must be met before a new or updated program code library can replace their code. In one embodiment, the following conditions may be supplied:

1. Response Time—this defines the execution response time and is specified as an improvement over the user crafted code. For instance, if the execution response time is 500 ms, a response time>20% implies that the IDE should only select libraries whose method execution response time provides a 20% improvement (or less than 400 ms).
2. Heap Size—this specifies the heap size consumption as an improvement over the user crafted code. This may be specified as a percentage and implies that the program code library method's relative consumption should be less than that of the user code by the percentage amount.
3. Rating—this is peer submitted rating of the program code library. In one embodiment, repositories allow program code library users to supply a rating for the program code library on a 1-5 scale (or stars) with a higher number implying a better rated program code library.
4. Defect Rate—this is the average number of defects submitted to the program code library over unit time. In one embodiment, the program code library developer may utilize publicly available defect tracking tools that provides such defect rates.
5. Adoption—this specifies the number of developers using the program code library according to various searching methods.
6. @consolidate—this specifies that the automatic program code library consolidation algorithm should be executed for the program code library, and the program code library should be included only if the execution returns true implying that a consolidation opportunity will occur if the program code library is selected.

Additionally, the conditions may be combined using Boolean operators and evaluated by the IDE. For instance, the user may specify that libraries whose response time>20% or heap size>10%, combined with rating>4 or defect rate<25, combined with adoption>10 are candidates for replacement.

Library Exclude: This may be a descriptive annotation, which identifies the excluded program code library and describes why the program code library was excluded. Such annotations may be automatically generated by an IDE, as they user interacts with the search results. Some example reasons for exclusion include style clashes, not a fluid design pattern, program code library size, and licensing. These reasons are exemplary in nature and should not be limited by the type or number of reasons for excluding a program code library.

New Library Detection

Periodically, the embodiments described herein may re-execute searches and validate the results against the exclusion list. If a new program code library is added to the repository that matches the description, has methods that meet the expectations, and does not match any of the exclusions reasons for other libraries, then the user may be notified that a new program code library may obviate the need for their method. The user may then examine the newly identified program code library and request the IDE replace their method code with the appropriate library call.

Library Change Detection

If a program code library that was previously excluded changes, and such change(s) results in the program code library no longer meeting the exclusion reason, then the user may be notified that a changed program code library may obviate the need for their method. The user may then examine the newly identified program code library and request the IDE to replace their method code with the appropriate program code library call. For example, a program code library could decrease in size, or be re-licensed.

Collaboration Between Library Developer and User

An additional feature may be an opportunity for the program code library developer to collaborate with the user. The execution of the "FutureLibraryReplace" annotation may be a comparison between the user's code and the program code library that deliver the same function. If the program code library performs poorly compared to the user crafted code, the IDE may prompt the developer to send their code to the program code library developer for potential merging. In an embodiment, if the program code library developer accepts the user code, the program code library developer IDE may automatically replace their method implementation with the one from the user crafted code.

Figure 4A:
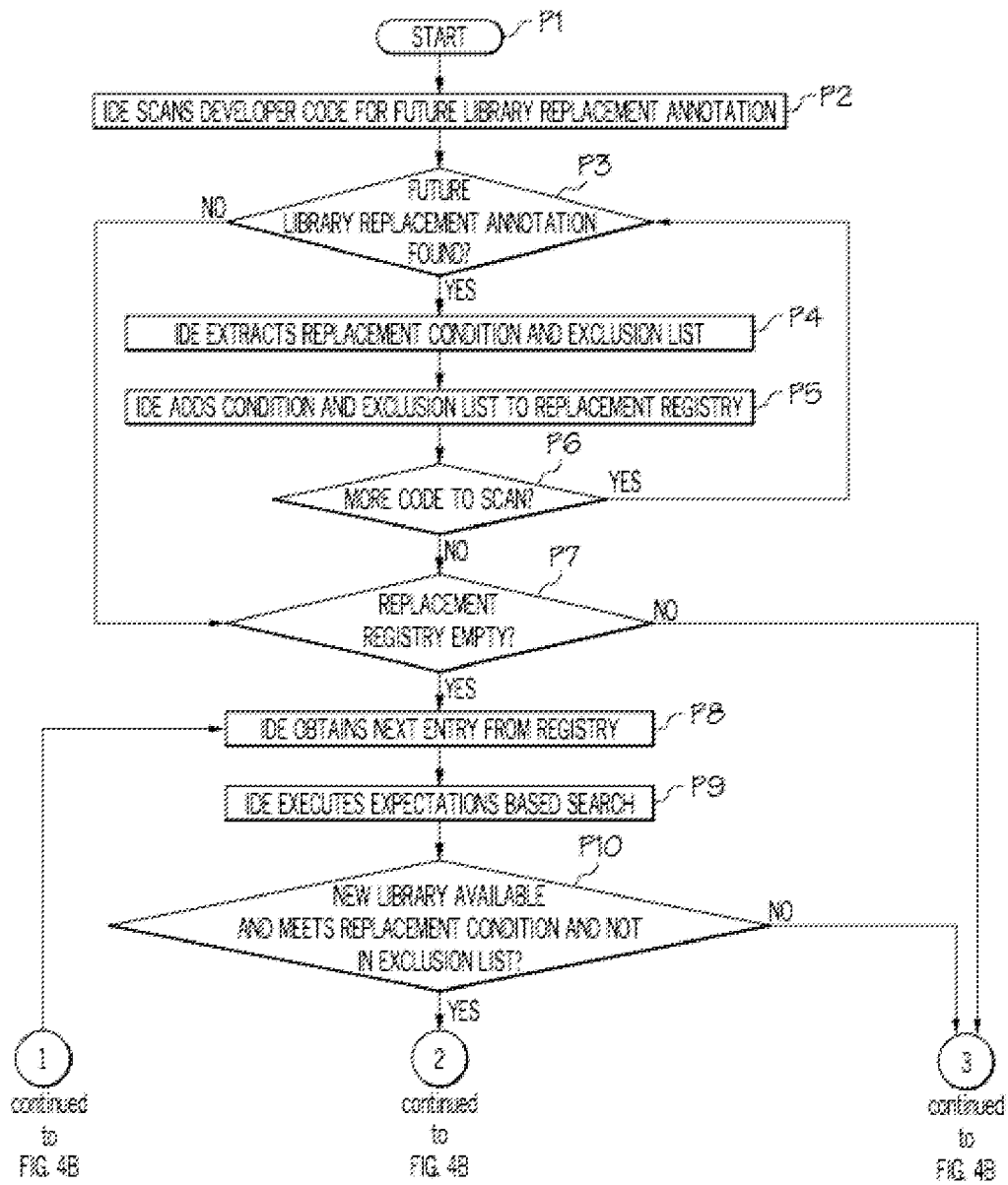
FIGS. 4A-B depict a method flow diagram according to an embodiment of the present invention.
Figure 4B:
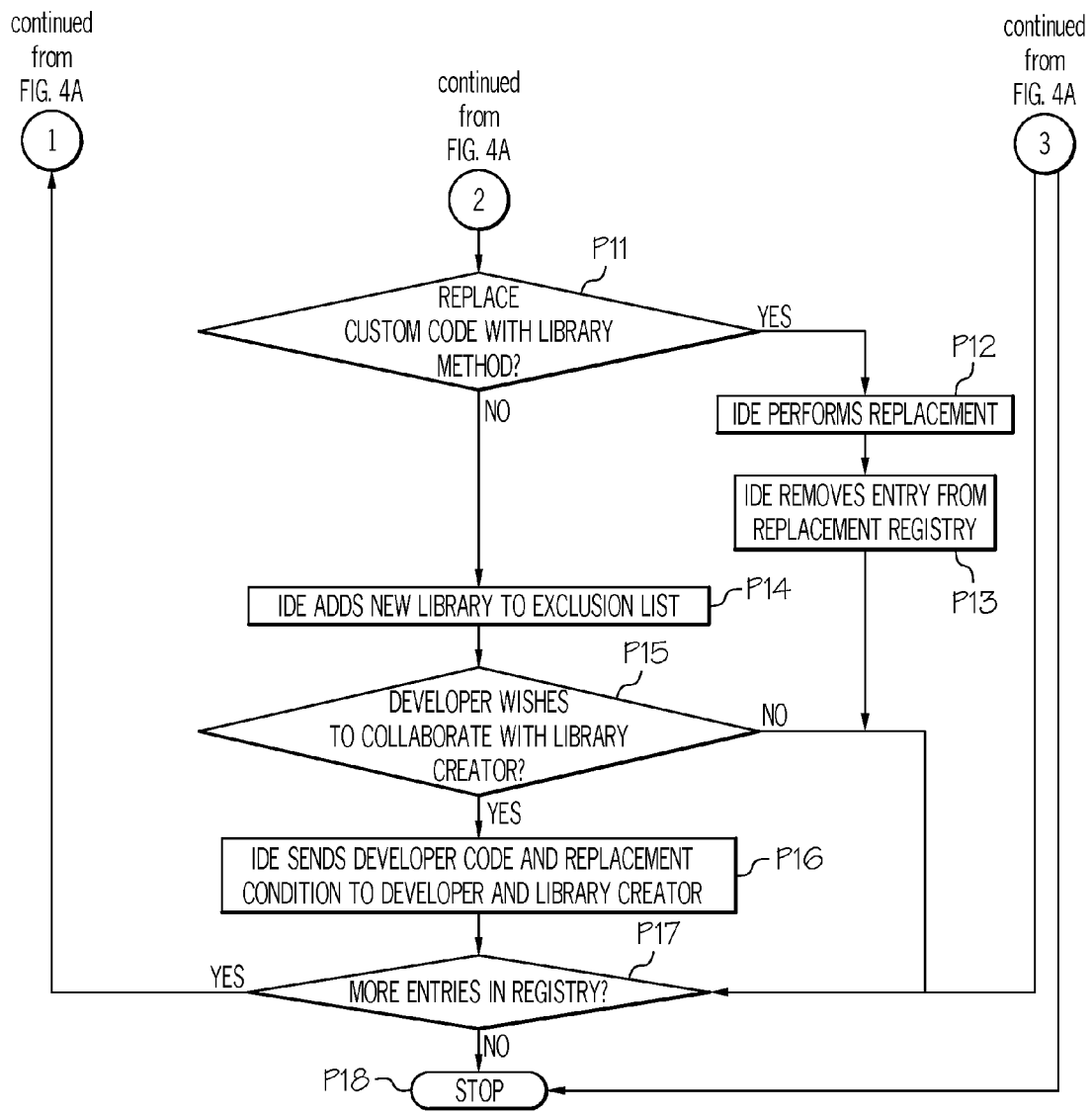

Referring now to FIGS. 4A-B, a method flow diagram according to an embodiment of the present invention is shown. The process is started in step P1. In step P2, the IDE scans developer code for a future library replacement annotation. In step P3, it is determined whether such an annotation is found. If not, the process may flow to step P7. If so, the IDE will extract a replacement condition and exclusions list in step P4, and add the replacement condition and exclusion list to a replacement registry in step P5. In step P6, it will be determined whether there is more code to scan. If so, the process returns to step P3, if no, it will be determined if the replacement registry is or is not empty in step P7. If the registry is empty, the process flows to step P8. If the registry is not empty, the IDE will obtain the next entry from the registry in step P8 and execute an expectation-based search in step P9. In step P10, it is determined whether a new library is available, meets replacement conditions, and is not in the exclusion list. If one or more of these criteria are not met, the process flows to step P17. If all of these criteria are met, it is determined in step P11 whether to replace custom code with a library method. If not, the process flows to step P14. If so the IDE will perform the replacement in step P12, and remove the entry from the replacement registry in step P13. In step P14, the IDE adds the new library to the exclusion list, and in step P15 it is determined whether the developer wishes to collaborate with the library's creator. If not, the process flows to step P17. If so, the IDE sends developer code and replacement condition(s) to the developer and library's creator in step P16. In step P17, it is determined whether there are additional entries in the registry. If so, the process returns to step P8. If not, the process may terminate/stop in step P18.

Figure 5:
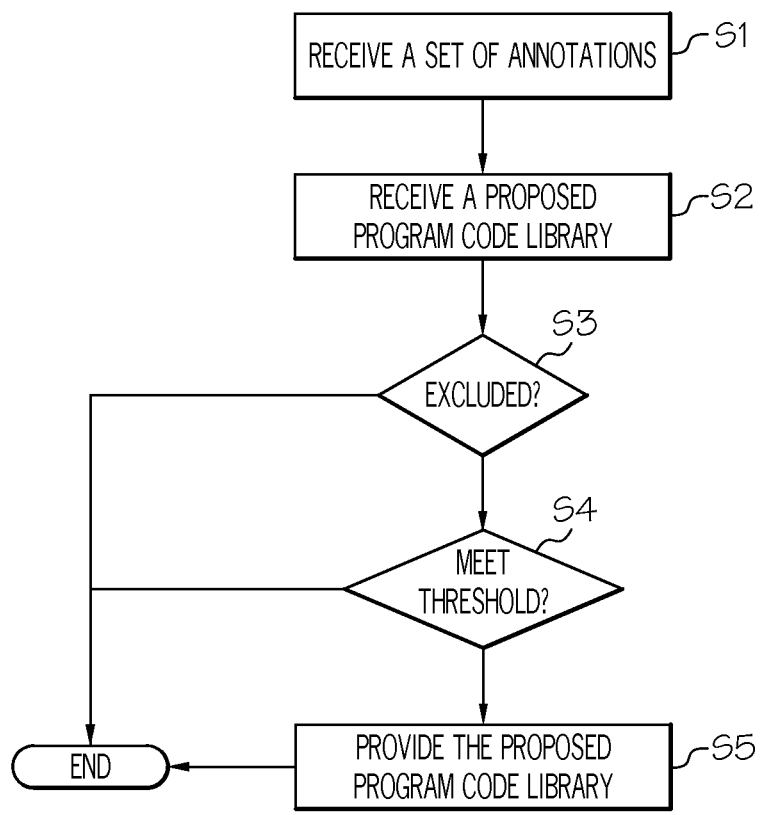
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, a set of annotations associated with a set of program code files is received in an integrated development environment (IDE). In step S2, a proposed program code library is received in the IDE. In step S3, it is determined whether the proposed program code library is an excluded program code library based on the set of annotations. If so, the process ends. If not, it is computed/determined in step S4 whether the proposed program code library meets one or more thresholds for replacing an existing program code library (e.g., based on at least one of: an attribute comparison and a micro-benchmarking analysis). If not, the process may end. If so, the proposed program code library may be implemented in step S5 before the process is ended.

While shown and described herein as an program code library processing solution, it is understood that the invention further provides various alternative embodiments. For example, in one embodiment, the invention provides a computer-readable/useable medium that includes computer program code to enable a computer infrastructure to provide program code library processing as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide program code library processing functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for program code library processing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for processing proposed program code libraries in a networked computing environment, comprising:
receiving a set of annotations associated with a set of program code files in an integrated development environment (IDE), the set of annotations comprising syntactic metadata added to the source code of the set of program code files, wherein the annotations are actionable and utilized by an execution environment to be retrievable at run-time, and wherein the set of annotations include one or more conditions for replacing a program code library;
receiving a proposed program code library in the IDE;
determining whether the proposed program code library is to be excluded based on the set of annotations;
computing whether the proposed program code library meets one or more thresholds for replacing an existing program code library, the computing being based on at least one of: an attribute comparison and a micro-benchmarking analysis; and
providing, responsive to the proposed program code library meeting the one or more thresholds, the proposed program code library to a computer device hosting the IDE.

2. The computer-implemented method of claim 1, the set of annotations comprising at least one of the following: a class attribute description, an expected return value for processing an input, the one or more thresholds for replacing the existing program code library, or a set of excluded program code libraries with a set of exclusion reasons.

3. The computer-implemented method of claim 2, the determining being based on the set of excluded program code libraries or the set of exclusion rules.

4. The computer-implemented method of claim 1, further comprising sending a notification if the proposed program code library is excluded or does not meet the one or more thresholds.

5. The computer-implemented method of claim 1, the micro-benchmarking analysis comprising a comparison of a set of micro-benchmarking times and a set of innovation stamps associated with the proposed program code library and the existing program code library.

6. The computer-implemented method of claim 1, further comprising detecting a tag indicating a need for the proposed program code library.

7. The computer-implemented method of claim 1, the networked computing environment comprising a cloud computing environment.

8. A system for processing proposed program code libraries in a networked computing environment, comprising:
a memory medium comprising instructions;
a bus coupled to the memory medium; and
a processor coupled to the bus that when executing the instructions causes the system to:
receive a set of annotations associated with a set of program code files in an integrated development environment (IDE), the set of annotations comprising syntactic metadata added to the source code of the set of program code files, wherein the annotations are actionable and utilized by an execution environment to be retrievable at run-time, and wherein the set of annotations include one or more conditions for replacing a program code library;
receive a proposed program code library in the IDE;
determine whether the proposed program code library is to be excluded based on the set of annotations;
compute whether the proposed program code library meets one or more thresholds for replacing an existing program code library, the computing being based on at least one of: an attribute comparison and a micro-benchmarking analysis; and
provide, responsive to the proposed program code library meeting the one or more thresholds, the proposed program code library to a computer device hosting the IDE.

9. The system of claim 8, the set of annotations comprising at least one of the following: a class attribute description, an expected return value for processing an input, the one or more thresholds for replacing the existing program code library, or a set of excluded program code libraries with a set of exclusion reasons.

10. The system of claim 9, the determination being based on the set of excluded program code libraries or the set of exclusion rules.

11. The system of claim 8, the memory medium further comprising instructions for causing the system to send a notification if the proposed program code library is excluded or does not meet the one or more thresholds.

12. The system of claim 8, the micro-benchmarking analysis comprising a comparison of a set of micro-benchmarking times and a set of innovation stamps associated with the proposed program code library and the existing program code library.

13. The system of claim 8, the memory medium further comprising instructions for causing the system to detect a tag indicating a need for the proposed program code library.

14. The system of claim 8, the networked computing environment comprising a cloud computing environment.

15. A computer program product for processing proposed program code libraries in a networked computing environment comprising a computer readable storage media, and program instructions stored on the computer readable storage media, to:
receive a set of annotations associated with a set of program code files in an integrated development environment (IDE)), the set of annotations comprising syntactic metadata added to the source code of the set of program code files, wherein the annotations are actionable and utilized by an execution environment to be retrievable at run-time, and wherein the set of annotations include one or more conditions for replacing a program code library;

receive a proposed program code library in the IDE;

determine whether the proposed program code library is to be excluded based on the set of annotations;

compute whether the proposed program code library meets one or more thresholds for replacing an existing program code library, the computing being based on at least one of: an attribute comparison and a micro-benchmarking analysis; and provide, responsive to the proposed program code library meeting the one or more thresholds, the proposed program code library to a computer device hosting the IDE.

16. The computer program product of claim 15, the set of annotations comprising at least one of the following: a class attribute description, an expected return value for processing an input, the one or more thresholds for replacing the existing program code library, or a set of excluded program code libraries with a set of exclusion reasons.

17. The computer program product of claim 16, the determination being based on the set of excluded program code libraries or the set of exclusion rules.

18. The computer program product of claim 15, the computer readable storage media further comprising instructions to send a notification if the proposed program code library is excluded or does not meet the one or more thresholds.

19. The computer program product of claim 15, the micro-benchmarking analysis comprising a comparison of a set of micro-benchmarking times and a set of innovation stamps associated with the proposed program code library and the existing program code library.

20. The computer program product of claim 15, the computer readable storage media further comprising instructions to detect a tag indicating a need for the proposed program code library.

21. The computer program product of claim 15, the networked computing environment comprising a cloud computing environment.

22. A method for deploying a system for processing proposed program code libraries in a networked computing environment, comprising:

providing a computer infrastructure being operable to:
receive a set of annotations associated with a set of program code files in an integrated development environment (IDE), the set of annotations comprising syntactic metadata added to the source code of the set of program code files, wherein the annotations are actionable and utilized by an execution environment to be retrievable at run-time, and wherein the set of annotations include one or more conditions for replacing an existing program code library;

receive a proposed program code library in the IDE;

determine whether the proposed program code library is to be excluded based on the set of annotations;

compute whether the proposed program code library meets one or more thresholds for replacing an existing program code library, the computing being based on at least one of: an attribute comparison and a micro-benchmarking analysis; and provide, responsive to the proposed program code library meeting the one or more thresholds, the proposed program code library to a computer device hosting the IDE.

* * * * *